US009850362B2

(12) United States Patent
Liao et al.

(10) Patent No.: US 9,850,362 B2
(45) Date of Patent: Dec. 26, 2017

(54) MODIFIED STARCH COMPOSITIONS, STARCH COMPOSITE FOAM MATERIALS AND METHOD FOR PREPARING THE STARCH COMPOSITE FOAM MATERIAL

(71) Applicant: INDUSTRIAL TECHNOLOGY RESEARCH INSTITUTE, Chutung, Hsinchu (TW)

(72) Inventors: Sheng-Ju Liao, Hsinchu (TW); Chih-Jen Chang, Toufen Township (TW); Yen-Po Liu, Zhudong Township (TW); Shih-Juh Liou, Hsinchu (TW); Yao-Chu Chung, Pingtung (TW); Chien-Ming Chen, Yangmei Township (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 14/329,428

(22) Filed: Jul. 11, 2014

(65) Prior Publication Data

US 2015/0065591 A1 Mar. 5, 2015

(30) Foreign Application Priority Data

Aug. 30, 2013 (TW) .............................. 102131203 A

(51) Int. Cl.
*C08J 9/35* (2006.01)
*C08J 9/00* (2006.01)
(Continued)

(52) U.S. Cl.
CPC ................ *C08J 9/35* (2013.01); *C08B 31/00* (2013.01); *C08B 31/08* (2013.01); *C08J 9/0061* (2013.01);
(Continued)

(58) Field of Classification Search
CPC ...... C08L 3/04; C08L 3/06; C08L 3/08; C08L 3/10; C08L 3/14; C08L 3/16; C08L 3/18; C08L 3/20; C08J 9/0061
See application file for complete search history.

(56) References Cited

U.S. PATENT DOCUMENTS

| 4,248,894 A | 2/1981 | MacKay et al. |
| 4,490,526 A | 12/1984 | Amort et al. |
| (Continued) | | |

FOREIGN PATENT DOCUMENTS

| CN | 1786072 A | 6/2006 |
| CN | 1800249 A | 7/2006 |
| (Continued) | | |

OTHER PUBLICATIONS

Ayoub, A.; Rizvi, S.S.H. Reactive Supercritical Fluid Extrusion for Development of Moisture Resistant Starch-Based Foams. J App Poly Sci vol. 120 2242-2250. 2010.*
(Continued)

*Primary Examiner* — Mike M Dollinger
*Assistant Examiner* — Christina Wales
(74) *Attorney, Agent, or Firm* — Birch, Stewart, Kolasch & Birch, LLP

(57) ABSTRACT

The present disclosure provides a modified starch composition. The modified starch composition includes starch with a terminal siloxane having 100 parts by weight, water having 30-70 parts by weight, and a polyol having 5-35 parts by weight. The present disclosure also provides a starch composite foam material and method for preparing the same.

11 Claims, 2 Drawing Sheets

(51) Int. Cl.
*C08L 3/08* (2006.01)
*C08J 9/12* (2006.01)
*C08L 1/02* (2006.01)
*C08B 31/00* (2006.01)
*C08B 31/08* (2006.01)

(52) U.S. Cl.
CPC .............. *C08J 9/122* (2013.01); *C08L 1/02* (2013.01); *C08L 3/08* (2013.01); *C08J 2203/06* (2013.01); *C08J 2205/044* (2013.01); *C08J 2367/02* (2013.01); *C08J 2383/06* (2013.01); *C08J 2467/02* (2013.01); *C08J 2483/06* (2013.01); *C08L 2203/14* (2013.01)

(56) References Cited

U.S. PATENT DOCUMENTS

| | | | |
|---|---|---|---|
| 5,308,879 | A | 5/1994 | Akamatu et al. |
| 5,589,518 | A | 12/1996 | Bastioli et al. |
| 5,709,827 | A * | 1/1998 | Andersen ............. B01F 3/1214 264/102 |
| 6,184,261 | B1 | 2/2001 | Biby et al. |
| 7,138,078 | B2 | 11/2006 | Gotoh |
| 7,638,560 | B2 | 12/2009 | Narayan et al. |
| 7,960,326 | B2 | 6/2011 | Ribble et al. |
| 2001/0014388 | A1* | 8/2001 | Bastioli ................ B32B 17/067 428/315.7 |
| 2006/0011458 | A1 | 1/2006 | Purcocks |
| 2008/0318318 | A1* | 12/2008 | Shimizu ................ B29B 7/14 435/396 |
| 2010/0311874 | A1* | 12/2010 | Mentink ............ C08G 18/3206 524/48 |
| 2011/0021101 | A1* | 1/2011 | Hawkins ............. C03C 25/1095 442/327 |
| 2011/0230576 | A1* | 9/2011 | Takahashi ............. C08J 9/0061 521/84.1 |
| 2012/0289629 | A1* | 11/2012 | Saint-Loup ............ C08G 18/00 524/53 |

FOREIGN PATENT DOCUMENTS

| | | | |
|---|---|---|---|
| CN | 1948374 | A | 4/2007 |
| CN | 101003646 | A | 7/2007 |
| CN | 101161683 | A | 4/2008 |
| CN | 101386703 | A | 3/2009 |
| CN | 101932647 | A | 12/2010 |
| CN | 102226015 | A | 10/2011 |
| CN | 102276878 | A | 12/2011 |
| CN | 102504343 | A | 6/2012 |
| CN | 10159524 | B | 7/2012 |
| EP | 0440962 | A2 | 8/1991 |
| JP | 59-207902 | A | 11/1984 |
| JP | 3-137101 | A | 6/1991 |
| JP | 2001-11221 | A | 1/2001 |
| JP | 2003-11201 | A | 1/2003 |
| JP | 2005-179508 | A | 7/2005 |
| JP | 2006-257360 | A | 9/2006 |
| JP | 2007-46019 | A | 2/2007 |
| JP | 2009-96965 | A | 5/2009 |
| JP | 2010-254859 | A | 11/2010 |
| JP | 2011-511121 | A | 4/2011 |
| TW | 201200551 | A | 1/2012 |
| WO | WO 2009/078309 | A1 | 6/2009 |

OTHER PUBLICATIONS

Chiu, C.; Solarek, D. Modification of Starches. Starch (Third Ed). A volume in Food Science and Technology. 2009, pp. 629-655.*
Chen et al., "Novel thermoplastic starch-clay nanocomposite foams", Nanotechnology, vol. 16, 2005, pp. 2334-2337.
Guan et al., "Functional properties of extruded foam composites of starch acetate and corn cob fiber", Industrial Crops and Products, vol. 19, 2004, pp. 255-269.
Guan et al., "Physical, Mechanical, and Macromolecular Properties of Starch Acetate during Extrusion Foaming Transformation", Ind. Eng. Chem. Res., vol. 45, 2006, pp. 3991-4000.
Mihai et al., "Extrusion Foaming of Semi-Crystalline PLA and PLA/Thermoplastic Starch Blends", Macromolecular Bioscience, vol. 7, 2007, pp. 907-920.
Tanrattanakul et al., "Effect of Potassium Persulfate on Graft Copolymerization and Mechanical Properties of Cassava Starch/Natural Rubber Foams", Journal of Applied Polymer Science, vol. 116, 2010, pp. 93-105.
Willett et al., "Processing and properties of extruded starch/polymer foams", Polymer, vol. 43, 2002, pp. 5935-5947.
Japanese Office Action for Japanese Application No. 2014-163032, dated Jul. 14, 2015, with an English translation.
Anonymous, "Research Project Final Report", Defra, SID5, Dec. 11, 2006, XP055169463, pp. 1-15.
Extended European Search Report, dated Mar. 3, 2015, for European Application No. 14182683.4.
Petzold et al., "Regioselective Functionalization of Starch: Synthesis and $^1$H NMR Characterization of 6-O-Silyl Ethers", Biomacromolecules, vol. 2, No. 3, Sep. 1, 2001, (Published on web Aug. 18, 2001), XP055169441, pp. 965-969.
Petzold et al., "Silylation of cellulose and starch-selectivity, structure analysis, and subsequent reactions", Cellulose, vol. 10, Sep. 1, 2003, XP055169417, pp. 251-269.
Programme Advisor et al., "Modified starch containing silane moieties: Supply Chain Project Fact Sheet", Defra, Jan. 1, 2004, XP055169450, 2 pages.

* cited by examiner

MODIFIED STARCH COMPOSITIONS, STARCH COMPOSITE FOAM MATERIALS AND METHOD FOR PREPARING THE STARCH COMPOSITE FOAM MATERIAL

CROSS REFERENCE TO RELATED APPLICATIONS

This Application claims priority of Taiwan Patent Application No. 102131203, filed on Aug. 30, 2013, the entirety of which is incorporated by reference herein.

TECHNICAL FIELD

The technical field relates to a modified starch composition containing water and a siloxane, a starch composite foam material and method for preparing the starch composite foam material.

BACKGROUND

Currently, mainstream bio-foam materials consist of two kinds of materials, polylactic acid (PLA) foam materials and starch foam materials. A deficiency of heat resistance exists in the former, which is incapable of meeting the requirements of the environmental tests for container transportation. To match the mechanical function of current PLA foam materials, the applications of PLA foam materials in the industry are mostly focused on the market for single-use disposable food trays. Nowadays, starch is one of the most abundant renewable resources in the world, with the characteristics of large output, diversified supply, low prices and superior biodegradability and antistaticity, etc., which is appropriate to developing competitive new-generation, low-carbon, light-weight, and environmentally-friendly materials for packaging or transportation. However, since ordinary starch is not easily foamed, the main technology of current starch foam material products comes from the patented technology of high-content, straight-chain starch (gene-modified corn starch) of Warner Lambert, at an extremely expensive price. This technology mainly uses water as a foaming agent, with the deficiency of difficulty of controlling the manufacturing process, and having a narrow process window. It is mostly employed as loose-filler with poor properties, and therefore, its application is difficult to expand.

SUMMARY

One embodiment of the disclosure provides a modified starch composition, comprising: starch with a terminal siloxane having 100 parts by weight; water having 30-70 parts by weight; and a polyol having 5-35 parts by weight.

One embodiment of the disclosure provides a starch composite foam material, comprising: the disclosed modified starch composition having a weight ratio of 25-90 wt %; and a thermoplastic polymer having a weight ratio of 10-75 wt %.

One embodiment of the disclosure provides a method for preparing a starch composite foam material, comprising: blending the disclosed modified starch composition and a thermoplastic polymer to form a starch glue; and performing a foaming process on the starch glue to form a starch composite foam material.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
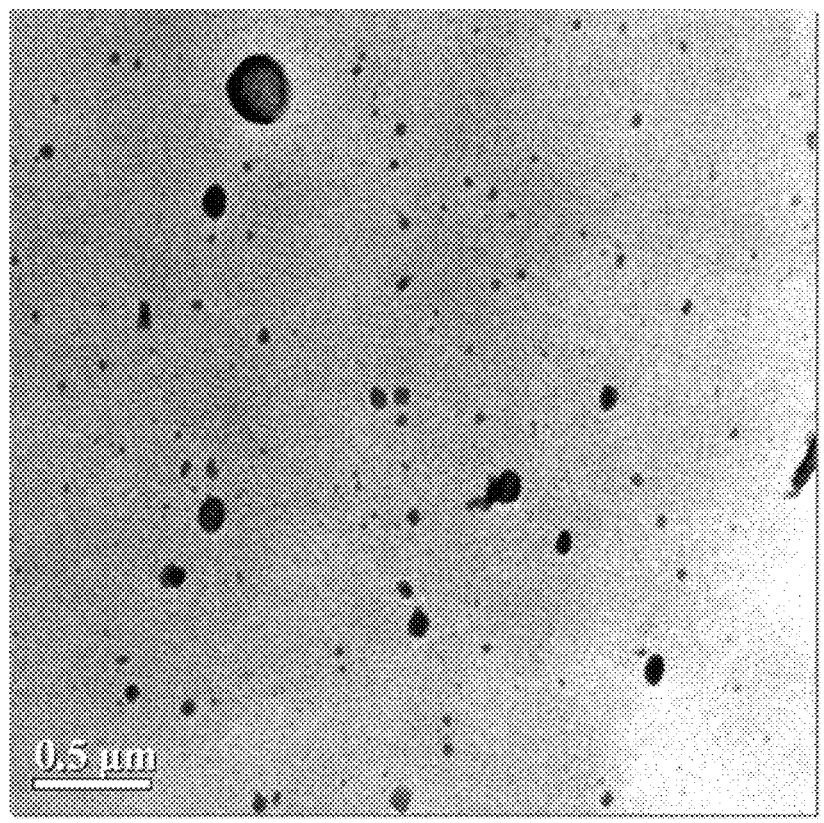
FIG. 1 shows a TEM image of a modified starch glue according to one embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides a modified starch composition, comprising: starch with a terminal siloxane having 100 parts by weight; water having 30-70 parts by weight; and a polyol having 5-35 parts by weight.

In one embodiment, the starch may comprise corn starch, tapioca starch or potato starch.

In one embodiment, the starch may comprise esterified starch or etherified starch.

In one embodiment, the siloxane connected to the terminal of the starch may comprise tetraethoxysilane (TEOS), aminopropyltriethoxysilane

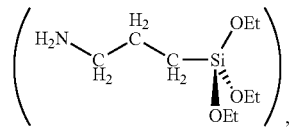

γ-glycidoxypropyltrimethoxysilane

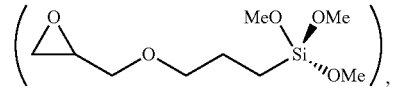

γ-methacryloxypropyltrimethoxysilane

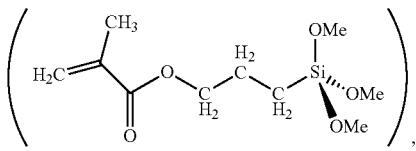

vinyltrimethoxysilane

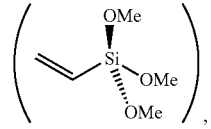

benzylethylenediaminepropyltrimethoxysilane monohydrochloride (PhCH$_2$N$^+$H$_2$C$_2$H$_4$NHC$_3$H$_6$Si(OCH$_3$)$_3$.Cl$^-$), or tetramethyl orthosilicate (TMOS).

In one embodiment, the polyol may comprise glycerol, sorbitol, polyethylene glycol (PEG), or combinations thereof. In one embodiment, the polyethylene glycol (PEG) has a weight average molecular weight ranging from about 200 to 6,000.

One embodiment of the disclosure provides a starch composite foam material, comprising: a modified starch composition having a weight ratio of 25-90 wt %; and a thermoplastic polymer having a weight ratio of 10-75 wt %.

In one embodiment, the modified starch composition comprises: starch with a terminal siloxane having 100 parts by weight; water having 30-70 parts by weight; and a polyol having 5-35 parts by weight.

In one embodiment, the starch may comprise corn starch, tapioca starch or potato starch.

In one embodiment, the starch may comprise esterified starch or etherified starch.

In one embodiment, the siloxane connected to the terminal of the starch may comprise tetraethoxysilane (TEOS), aminopropyltriethoxysilane $$\left( H_2N - \underset{H_2}{C} - \underset{H_2}{C} - \underset{H_2}{C} - Si \begin{matrix} OEt \\ \vdots \\ OEt \\ OEt \end{matrix} \right),$$

γ-glycidoxypropyltrimethoxysilane $$\left( \overset{O}{\triangle} \diagdown O \diagdown Si \begin{matrix} MeO & OMe \\ \vdots \\ OMe \end{matrix} \right),$$

γ-methacryloxypropyltrimethoxysilane $$\left( \begin{matrix} CH_3 \\ H_2C = C - C - O - \underset{H_2}{C} - \underset{H_2}{C} - \underset{H_2}{C} - Si \begin{matrix} OMe \\ \vdots \\ OMe \\ OMe \end{matrix} \\ \parallel \\ O \end{matrix} \right),$$

vinyltrimethoxysilane $$\left( = Si \begin{matrix} OMe \\ \vdots \\ OMe \\ OMe \end{matrix} \right),$$

benzylethylenediaminepropyltrimethoxysilane monohydrochloride (PhCH$_2$N$^+$H$_2$C$_2$H$_4$NHC$_3$H$_6$Si(OCH$_3$)$_3$.Cl$^-$), or tetramethyl orthosilicate (TMOS).

In one embodiment, the thermoplastic polymer may comprise aliphatic-aromatic copolymers or aliphatic polyesters.

In one embodiment, the aliphatic-aromatic copolymer may comprise poly(butylene adipate-co-terephthalate) (PBAT).

In one embodiment, the aliphatic polyester may comprise poly(butylene succinate) (PBS), poly(butylene succinate-co-adipate), polylactic acid (PLA), poly(glycolide-co-lactide) (PGLA), hydroxyalkyl esters, polycaprolactone (PCL) or carbon dioxide polymers.

In one embodiment, the thermoplastic polymer may comprise ethylene-vinylalcohol (EVOH) copolymers, thermoplastic polyvinyl alcohol (PVOH), thermoplastic cellulose, polyurethane or polyester amide.

In one embodiment, the disclosed starch composite foam material has a pore size ranging from about 1 μm to 100 μm.

One embodiment of the disclosure provides a method for preparing a starch composite foam material, comprising: blending a modified starch composition and a thermoplastic polymer to form a starch glue; and performing a foaming process on the starch glue to form a starch composite foam material.

In one embodiment, the modified starch composition comprises: starch with a terminal siloxane having 100 parts by weight; water having 30-70 parts by weight; and a polyol having 5-35 parts by weight.

In one embodiment, the starch may comprise corn starch, tapioca starch or potato starch.

In one embodiment, the starch may comprise esterified starch or etherified starch.

In one embodiment, the siloxane connected to the terminal of the starch may comprise tetraethoxysilane (TEOS), aminopropyltriethoxysilane $$\left( H_2N - \underset{H_2}{C} - \underset{H_2}{C} - \underset{H_2}{C} - Si \begin{matrix} OEt \\ \vdots \\ OEt \\ OEt \end{matrix} \right),$$

γ-glycidoxypropyltrimethoxysilane $$\left( \overset{O}{\triangle} \diagdown O \diagdown Si \begin{matrix} MeO & OMe \\ \vdots \\ OMe \end{matrix} \right),$$

γ-methacryloxypropyltrimethoxysilane $$\left( \begin{matrix} CH_3 \\ H_2C = C - C - O - \underset{H_2}{C} - \underset{H_2}{C} - \underset{H_2}{C} - Si \begin{matrix} OMe \\ \vdots \\ OMe \\ OMe \end{matrix} \\ \parallel \\ O \end{matrix} \right),$$

vinyltrimethoxysilane $$\left( = Si \begin{matrix} OMe \\ \vdots \\ OMe \\ OMe \end{matrix} \right),$$

benzylethylenediaminepropyltrimethoxysilane monohydrochloride (PhCH$_2$N$^+$H$_2$C$_2$H$_4$NHC$_3$H$_6$Si(OCH$_3$)$_3$.Cl$^-$), or tetramethyl orthosilicate (TMOS).

In one embodiment, the polyol may comprise glycerol, sorbitol, polyethylene glycol (PEG), or combinations thereof. In one embodiment, the polyethylene glycol (PEG) has a weight average molecular weight ranging from about 200 to 6,000.

In one embodiment, the thermoplastic polymer may comprise aliphatic-aromatic copolymers or aliphatic polyesters.

In one embodiment, the aliphatic-aromatic copolymer may comprise poly(butylene adipate-co-terephthalate) (PBAT).

In one embodiment, the aliphatic polyester may comprise poly(butylene succinate) (PBS), poly(butylene succinate-co-adipate), polylactic acid (PLA), poly(glycolide-co-lactide) (PGLA), hydroxyalkyl esters, polycaprolactone (PCL) or carbon dioxide polymers.

In one embodiment, the thermoplastic polymer may comprise ethylene-vinylalcohol (EVOH) copolymers, thermoplastic polyvinyl alcohol (PVOH), thermoplastic cellulose, polyurethane or polyester amide.

In one embodiment, the starch glue may further comprise silicon dioxide ($SiO_2$) nanoparticles having a particle size ranging from about 1 nm to 300 nm.

In one embodiment, the foaming process may be a supercritical foaming process or a near-supercritical foaming process.

In one embodiment, the disclosed preparation method further comprises adding a physical or chemical foaming agent during the foaming process. In one embodiment, the physical foaming agent may comprise inert gas: for example, carbon dioxide or nitrogen gas.

In one embodiment, the disclosed preparation method further comprises adding various additives, for example, nucleating agents, antioxidants, anti-UV agents, antibacterial agents, lubricants or foaming aids, during the preparation of the modified starch composition or formation of the starch glue.

In one embodiment, the nucleating agent may comprise talc, calcium carbonate, mica, montmorillonite, clay, natural fibers or a mixture thereof.

Example 1

The Preparation of the Present Starch Composite Foam Material (1)

First, 100 phr of corn starch, 50 phr of water and 25 phr of glycerol were poured into a kneading machine and stirred for 5-20 minutes at 65-95° C. 2 phr of a modifier of γ-glycidoxypropyltrimethoxysilane

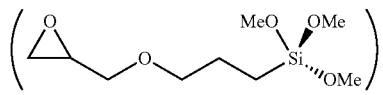

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 30 wt % of modified thermoplastic starch (6040-TPS) and 70 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1. The "phr" represents parts per hundreds of rubber (or resin).

Example 2

The Preparation of the Present Starch Composite Foam Material (2)

First, 100 phr of corn starch, 50 phr of water and 25 phr of glycerol were poured into a kneading machine and stirred for 5-20 minutes at 65-95° C. 5 phr of a modifier of γ-glycidoxypropyltrimethoxysilane

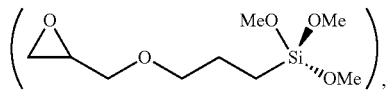

Figure 2:
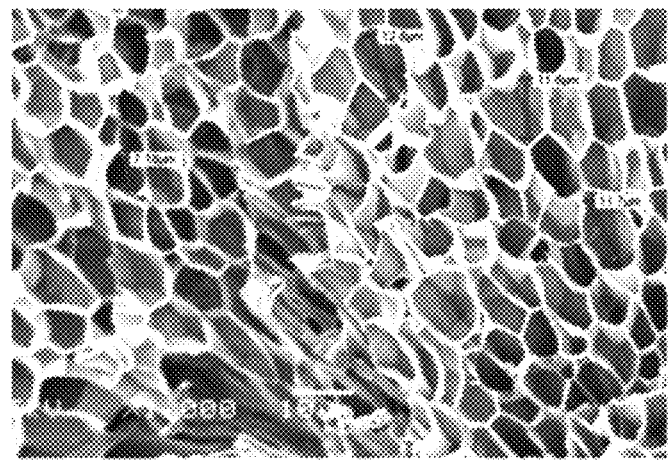
FIG. 2 shows a SEM image of a starch composite foam material according to one embodiment of the disclosure.

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-TPS) and 50 wt % of poly(butylene adipate-co-terephthalate) (PBAT) were conducted into a twin-screw extruder and granulated with a screw speed of 30-250 rpm at 100-190° C. to form pellets of modified starch glue, as shown in FIG. 1. FIG. 1 is a TEM image of the modified starch glue of this example. In this figure, formation of a large number of silicon dioxide ($SiO_2$) nanoparticles having a particle size ranging from 50 nm to 300 nm was observed. After injection molding of the pellets, the resulting square specimen was conducted into a supercritical foaming process at a pressure of 800-5,000 psi and a temperature of 80-120° C. The starch composite foam material was thus prepared, as shown in FIG. 2. FIG. 2 is a SEM image of the starch composite foam material of this example. The pores of the starch composite foam material modified with γ-glycidoxypropyltrimethoxysilane were uniform, ranging from about 10 μm to 20 μm. In this figure, starch granules did not significantly exist in the starch composite foam material. The density, foaming ratio, hardness, permanent compression set value and rebound resilience of the starch composite foam material were tested. The results are shown in Table 1.

Example 3

The Preparation of the Present Starch Composite Foam Material (3)

First, 100 phr of corn starch, 50 phr of water and 25 phr of glycerol were poured into a kneading machine and stirred for 5-20 minutes at 65-95° C. 10 phr of a modifier of γ-glycidoxypropyltrimethoxysilane

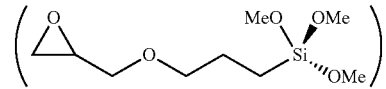

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 70 wt % of modified thermoplastic starch (6040-TPS) and 30 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1.

Example 4

The Preparation of the Present Starch Composite Foam Material (4)

First, 100 phr of corn starch, 50 phr of water and 25 phr of glycerol were poured into a kneading machine and stirred for 5-20 minutes at 65-95° C. 15 phr of a modifier of γ-glycidoxypropyltrimethoxysilane

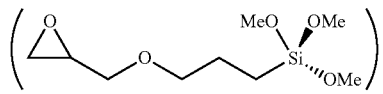

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 90 wt % of modified thermoplastic starch (6040-TPS) and 10 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1.

Example 5

The Preparation of the Present Starch Composite Foam Material (5)

First, 100 phr of corn starch, 50 phr of water and 25 phr of glycerol were poured into a kneading machine and stirred for 5-20 minutes at 65-95° C. 10 phr of a modifier of benzylethylenediaminepropyltrimethoxysilane monohydrochloride ($PhCH_2N^+H_2C_2H_4NHC_3H_6Si(OCH_3)_3.Cl^-$) (AY43049, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 30 wt % of modified thermoplastic starch (AY43049-TPS) and 70 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1.

Example 6

The Preparation of the Present Starch Composite Foam Material (6)

First, 100 phr of corn starch, 50 phr of water and 25 phr of glycerol were poured into a kneading machine and stirred for 5-20 minutes at 65-95° C. 10 phr of a modifier of aminopropyltriethoxysilane

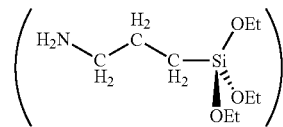

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6011-TPS) and 50 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1.

Example 7

The Preparation of the Present Starch Composite Foam Material (7)

First, 100 phr of corn starch, 50 phr of water and 25 phr of glycerol were poured into a kneading machine and stirred for 5-20 minutes at 65-95° C. 10 phr of a modifier of γ-methacryloxypropyltrimethoxysilane

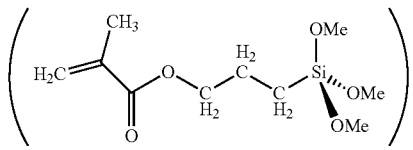

(6030, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 70 wt % of modified thermoplastic starch (6030-TPS) and 30 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1.

Example 8

The Preparation of the Present Starch Composite Foam Material (8)

First, 100 phr of corn starch, 50 phr of water and 25 phr of glycerol were poured into a kneading machine and stirred for 5-20 minutes at 65-95° C. 10 phr of a modifier of vinyltrimethoxysilane

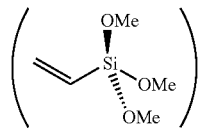

(6300, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 70 wt % of modified thermoplastic starch (6300-TPS) and 30 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1.

Example 9

The Preparation of the Present Starch Composite Foam Material (9)

First, 100 phr of corn starch, 50 phr of water and 25 phr of glycerol were poured into a kneading machine and stirred for 5-20 minutes at 65-95° C. 10 phr of a modifier of tetraethoxysilane (TEOS) (purchased from ACROS Organics) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (TEOS-TPS) and 50 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 1.

TABLE 1

| | | Examples | | | | | | | | |
|---|---|---|---|---|---|---|---|---|---|---|
| | | 1 | 2 | 3 | 4 | 5 | 6 | 7 | 8 | 9 |
| Modified TPS glue composition | | | | | | | | | | |
| PBAT | % | 70 | 50 | 30 | 10 | 70 | 50 | 30 | 30 | 50 |
| 6040-TPS | % | 30 | 50 | 70 | 90 | | | | | |
| AY43049-TPS | % | | | | | 30 | | | | |
| 6011-TPS | % | | | | | | 50 | | | |
| 6030-TPS | % | | | | | | | 70 | | |
| 6300-TPS | % | | | | | | | | 70 | |
| TEOS-TPS | % | | | | | | | | | 50 |
| Modified TPS composition | | | | | | | | | | |
| Corn starch | phr | 100 | 100 | 100 | 100 | 100 | 100 | 100 | 100 | 100 |
| Water | phr | 50 | 50 | 50 | 50 | 50 | 50 | 50 | 50 | 50 |
| Glycerol | phr | 25 | 25 | 25 | 25 | 25 | 25 | 25 | 25 | 25 |
| 6040 | phr | 2 | 5 | 10 | 15 | | | | | |
| AY43049 | phr | | | | | 10 | | | | |
| 6011 | phr | | | | | | 10 | | | |
| 6030 | phr | | | | | | | 10 | | |
| 6300 | phr | | | | | | | | 10 | |
| TEOS | | | | | | | | | | 10 |
| Properties of foam material | | | | | | | | | | |
| Density | | 0.1422 | 0.1789 | 0.4258 | 1.1499 | 0.0929 | 0.2717 | 0.4789 | 0.5427 | 0.2036 |
| Foaming ratio | | 9.4 | 7.4 | 3.1 | 1.3 | 14.6 | 6.1 | 2.8 | 2.4 | 6.4 |
| Hardness | Type C | 24 | 32 | 58 | 84 | 19 | 44 | 51 | 60 | 44 |
| Permanent compression | % | 94 | 85 | 85 | 65 | 96 | 79 | 96 | 89.9 | 86 |

TABLE 1-continued

| | | Examples | | | | | | | |
|---|---|---|---|---|---|---|---|---|---|
| | | 1 | 2 | 3 | 4 | 5 | 6 | 7 | 8 | 9 |
| set value | | | | | | | | | | |
| Rebound resilience | % | 49 | 48 | 39 | 28 | 49 | 47 | 38 | 39 | 44 |

In light of the test results in Table 1, after the modification of the starch with the siloxane, the content of the thermoplastic starch (TPS) in the starch composite foam material was increased to 90%. As the content of the TPS was increased, the starch composite foam material was still successfully foamed.

Example 10

The Preparation of the Present Starch Composite Foam Material (10)

First, 100 phr of corn starch, 50 phr of water and 25 phr of glycerol were poured into a kneading machine and stirred for 5-20 minutes at 65-95° C. 10 phr of a modifier of γ-glycidoxypropyltrimethoxysilane

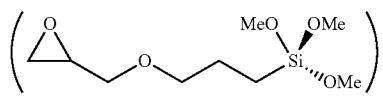

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-TPS) and 50 wt % of polylactic acid (PLA) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 60-120° C. The starch composite foam material was thus prepared. The density, foaming ratio, hardness, permanent compression set value and rebound resilience of the starch composite foam material were tested. The results are shown in Table 2.

Example 11

The Preparation of the Present Starch Composite Foam Material (11)

First, 100 phr of corn starch, 50 phr of water and 25 phr of glycerol were poured into a kneading machine and stirred for 5-20 minutes at 65-95° C. 10 phr of a modifier of γ-glycidoxypropyltrimethoxysilane

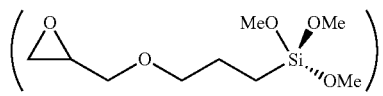

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-TPS) and 50 wt % of polycaprolactone (PCL) were conducted into a twin-screw extruder and granulated with a screw speed of 30-250 rpm at 65-90° C. to form pellets of modified starch glue. After injection molding of the pellets, the resulting square specimen was conducted into a supercritical foaming process at a pressure of 800-5,000 psi and a temperature of 25-60° C. The starch composite foam material was thus prepared. The density, foaming ratio, hardness, permanent compression set value and rebound resilience of the starch composite foam material were tested. The results are shown in Table 2.

TABLE 2

| | | Examples | |
|---|---|---|---|
| | | 10 | 11 |
| Modified TPS glue composition | | | |
| PLA | % | 50 | |
| PCL | % | | 50 |
| 6040-TPS | % | 50 | 50 |
| Modified TPS composition | | | |
| Corn starch | phr | 100 | 100 |
| Water | phr | 50 | 50 |
| Glycerol | phr | 25 | 25 |
| 6040 | phr | 10 | 10 |
| Properties of foam material | | | |
| Density | | 0.2087 | 0.1319 |
| Foaming ratio | | 6.3 | 9.16 |
| Hardness | Type C | 78 | 24 |
| Permanent compression set value | % | 99 | 97 |
| Rebound resilience | % | 41 | 31 |

Example 12

The Preparation of the Present Starch Composite Foam Material (12)

First, 100 phr of corn starch, 50 phr of water, 25 phr of glycerol and 10 phr of PEG300 were poured into a kneading machine and stirred for 5-20 minutes at 65-95° C. 10 phr of a modifier of γ-glycidoxypropyltrimethoxysilane

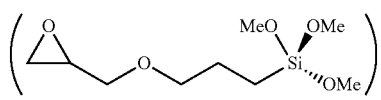

Figure 3:
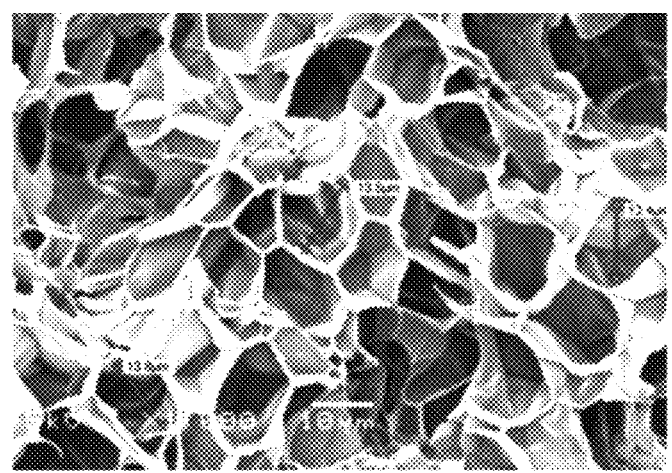
FIG. 3 shows a SEM image of a starch composite foam material according to one embodiment of the disclosure.

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-PEG-TPS) and 50 wt % of poly (butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared, as shown in FIG. 3. FIG. 3 is a SEM image of the starch composite foam material of this example. In this figure, the pore size of the foam material ranged from about 10 µm to 20 µm. A strong interaction force between starch and polymer substrate was observed. The density, foaming ratio, hardness, permanent compression set value and rebound resilience of the starch composite foam material were tested. The results are shown in Table 3.

Example 13

The Preparation of the Present Starch Composite Foam Material (13)

First, 100 phr of tapioca starch, 50 phr of water, 25 phr of glycerol and 10 phr of PEG1000 were poured into a kneading machine and stirred for 5-20 minutes at 65-95° C. 10 phr of a modifier of γ-glycidoxypropyltrimethoxysilane

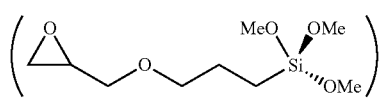

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-PEG-TPS) and 50 wt % of poly (butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 3.

Example 14

The Preparation of the Present Starch Composite Foam Material (14)

First, 100 phr of potato starch, 50 phr of water, 25 phr of glycerol and 10 phr of PEG2000 were poured into a kneading machine and stirred for 5-20 minutes at 65-95° C. 10 phr of a modifier of γ-glycidoxypropyltrimethoxysilane

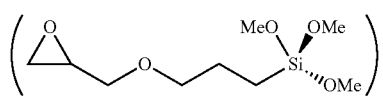

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-PEG-TPS) and 50 wt % of poly (butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 3.

Example 15

The Preparation of the Present Starch Composite Foam Material (15)

First, 100 phr of esterified starch, 50 phr of water, 25 phr of glycerol and 10 phr of PEG4000 were poured into a kneading machine and stirred for 5-20 minutes at 65-95° C. 10 phr of a modifier of γ-glycidoxypropyltrimethoxysilane

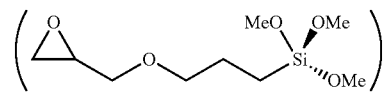

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-PEG-TPS) and 50 wt % of poly (butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 3.

Example 16

The Preparation of the Present Starch Composite Foam Material (16)

First, 100 phr of etherified starch, 50 phr of water, 25 phr of glycerol and 10 phr of PEG6000 were poured into a kneading machine and stirred for 5-20 minutes at 65-95° C. 10 phr of a modifier of γ-glycidoxypropyltrimethoxysilane

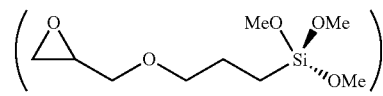

(6040, purchased from Dow Corning) was then added to the kneading machine and kneaded for 5-25 minutes. After kneading, the kneaded matter was conducted into a single-screw granulator at 85-130° C. to prepare modified thermoplastic starch particles. Next, 50 wt % of modified thermoplastic starch (6040-PEG-TPS) and 50 wt % of poly(butylene adipate-co-terephthalate) (PBAT) were conducted into a twin-screw extruder and granulated with a screw speed of 30-250 rpm at 100-190° C. to form pellets of modified starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 3.

TABLE 3

| | | Examples | | | | |
|---|---|---|---|---|---|---|
| | | 12 | 13 | 14 | 15 | 16 |
| Modified TPS glue composition | | | | | | |
| PBAT | % | 50 | 50 | 50 | 50 | 50 |
| 6040-PEG-TPS | % | 50 | 50 | 50 | 50 | 50 |
| Modified TPS composition | | | | | | |
| Corn starch | phr | 100 | | | | |
| Tapioca starch | phr | | 100 | | | |
| Potato starch | phr | | | 100 | | |
| Esterified starch | phr | | | | 100 | |
| Etherified starch | phr | | | | | 100 |
| Water | phr | 50 | 50 | 50 | 50 | 50 |
| Glycerol | phr | 25 | 25 | 25 | 25 | 25 |
| 6040 | phr | 10 | 10 | 10 | 10 | 10 |
| PEG300 | phr | 10 | | | | |
| PEG1000 | phr | | 10 | | | |
| PEG2000 | phr | | | 10 | | |
| PEG4000 | phr | | | | 10 | |
| PEG6000 | phr | | | | | 10 |
| Properties of foam material | | | | | | |
| Density | | 0.122 | 0.1341 | 0.1836 | 1.842 | 1.895 |
| Foaming ratio | | 10.49 | 9.5 | 7.3 | 7.4 | 7.2 |
| Hardness | Type C | 38 | 28 | 30 | 28 | 26 |
| Permanent compression set value | % | 93 | 95 | 89 | 89 | 82 |
| Rebound resilience | % | 36 | 47 | 44 | 44 | 43 |

Comparative Example 1

The Preparation of the Starch Composite Foam Material (1)

First, 100 phr of corn starch, 50 phr of water and 25 phr of glycerol were poured into a kneading machine and stirred for 5-20 minutes at 65-95° C. After kneading, the kneaded matter was conducted into a single-screw granulator at 85-130° C. to prepare thermoplastic starch particles. Next, 40 wt % of thermoplastic starch (TPS) and 60 wt % of poly(butylene adipate-co-terephthalate) (PBAT) were conducted into a twin-screw extruder and granulated with a screw speed of 30-250 rpm at 100-190° C. to form pellets of starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 4.

Comparative Example 2

The Preparation of the Starch Composite Foam Material (2)

First, 100 phr of corn starch, 50 phr of water and 25 phr of glycerol were poured into a kneading machine and stirred for 5-20 minutes at 65-95° C. After kneading, the kneaded matter was conducted into a single-screw granulator at 85-130° C. to prepare thermoplastic starch particles. Next, 50 wt % of thermoplastic starch (TPS) and 50 wt % of poly(butylene adipate-co-terephthalate) (PBAT) were conducted into a twin-screw extruder and granulated with a screw speed of 30-250 rpm at 100-190° C. to form pellets of starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 4.

Comparative Example 3

The Preparation of the Starch Composite Foam Material (3)

First, 100 phr of corn starch, 50 phr of water and 25 phr of glycerol were poured into a kneading machine and stirred for 5-20 minutes at 65-95° C. After kneading, the kneaded matter was conducted into a single-screw granulator at 85-130° C. to prepare thermoplastic starch particles. Next, 60 wt % of thermoplastic starch (TPS) and 40 wt % of poly(butylene adipate-co-terephthalate) (PBAT) were conducted into a twin-screw extruder and granulated with a screw speed of 30-250 rpm at 100-190° C. to form pellets of starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 4.

Comparative Example 4

The Preparation of the Starch Composite Foam Material (4)

First, 100 phr of corn starch, 50 phr of water and 25 phr of glycerol were poured into a kneading machine and stirred for 5-20 minutes at 65-95° C. After kneading, the kneaded matter was conducted into a single-screw granulator at 85-130° C. to prepare thermoplastic starch particles. Next, 70 wt % of thermoplastic starch (TPS) and 30 wt % of poly(butylene adipate-co-terephthalate) (PBAT) were conducted into a twin-screw extruder and granulated with a screw speed of 30-250 rpm at 100-190° C. to form pellets of starch glue. After injection molding of the pellets, the resulting square specimen was conducted into a supercritical foaming process at a pressure of 800-5,000 psi and a temperature of 80-120° C. The starch composite foam material was thus prepared. The density, foaming ratio, hardness, permanent compression set value and rebound resilience of the starch composite foam material were tested. The results are shown in Table 4.

TABLE 4

|  |  | Comparative Examples | | | |
| --- | --- | --- | --- | --- | --- |
|  |  | 1 | 2 | 3 | 4 |
| TPS glue composition | | | | | |
| PBAT | % | 60 | 50 | 40 | 30 |
| TPS (non-modified) | % | 40 | 50 | 60 | 70 |
| TPS composition | | | | | |
| Corn starch | phr | 100 | 100 | 100 | 100 |
| Water | phr | 50 | 50 | 50 | 50 |
| Glycerol | phr | 25 | 25 | 25 | 25 |
| Properties of foam material | | | | | |
| Density |  | 0.197 | 0.2937 | 0.6046 | 1.053 |
| Foaming ratio |  | 6.5 | 4.4 | 2.1 | 1.3 |
| Hardness | Type C | 21 | 27 | 50 | 80 |
| Permanent compression set value | % | 66 | 73 | 84 | 73 |
| Rebound resilience | % | 38 | 37 | 34 | 32 |

In light of the test results in Table 4, the amount of non-modified starch added to the glue can only be 70% at most. This amount is at the extremity of the blending process and it is not possible to further increase the content of this component. In the disclosure, the siloxane with reactive functional groups is introduced to the end of the starch chains, which makes the starch create a three-dimensional structure and its chains expand and entangle with each other to meet the demand of the structural strength of the foam material. In addition to the modification which creates the three-dimensional structure, in the disclosure, the second phase of the decomposable thermoplastic polymer and various interface-compatible modifiers are introduced to adjust the flow characteristics of the entire material system and form the glue with the starch to improve the melting strength of the entire material in order to meet the requirements of the microporous foam material.

The disclosure provides a competitive starch-based bio-decomposable foam material with high starch content, through functionalized modification of industrial starch and glue technology, giving it an appropriate melting strength and chain entanglement, and using a green foam-processing technology (using supercritical fluid for forming micropores) to develop the starch-based microporous foam material with characteristics such as cell-size uniformity, lively elasticity, flexibility, and superior buffering. It is capable of application in the fields of fitness equipment (commanding high prices) and disposable materials (for transportation and packaging of electronics required by applicable laws, etc.). This is one kind of environmentally-friendly low-carbon, and light-weight green material with high performance.

It will be apparent to those skilled in the art that various modifications and variations can be made to the disclosed embodiments. It is intended that the specification and examples be considered as exemplary only, with the true scope of the disclosure being indicated by the following claims and their equivalents.

What is claimed is:

1. A starch composite foam material, comprising:
   a modified starch composition having a weight ratio of 25-90 wt %, said modified starch composition comprising starch with a siloxane having 100 parts by weight, water having 30-70 parts by weight, and a polyol having 5-35 parts by weight, wherein the siloxane has 5-15 phr based on 100 phr of the starch; and
   a thermoplastic polymer having a weight ratio of 10-75 wt %.

2. The starch composite foam material as claimed in claim 1, wherein the thermoplastic polymer comprises aliphatic-aromatic copolymers or aliphatic polyesters.

3. The starch composite foam material as claimed in claim 2, wherein the aliphatic-aromatic copolymer comprises poly(butylene adipate-co-terephthalate) (PBAT).

4. The starch composite foam material as claimed in claim 2, wherein the aliphatic polyester comprises poly(butylene succinate) (PBS), poly(butylene succinate-co-adipate), polylactic acid (PLA), poly(glycolide-co-lactide) (PGLA), hydroxyalkyl esters, polycaprolactone (PCL) or carbon dioxide polymers.

5. The starch composite foam material as claimed in claim 1, wherein the thermoplastic polymer comprises ethylene-vinylalcohol (EVOH) copolymers, thermoplastic polyvinyl alcohol (PVOH), thermoplastic cellulose, polyurethane or polyester amide.

6. The starch composite foam material as claimed in claim 1, wherein the starch composite foam material has a pore size ranging from 1 μm to 100 μm.

7. A method for preparing a starch composite foam material, comprising:
   blending a modified starch composition having a weight ratio of 25-90 wt % and a thermoplastic polymer having a weight ratio of 10-75 wt % to form a starch glue said modified starch composition comprising starch with a siloxane having 100 parts by weight, water having 30-70 parts by weight, and a polyol having 5-35 parts by weight, wherein the siloxane has 5-15 phr based on 100 phr of the starch; and performing a foaming process on the starch glue to form a starch composite foam material.

8. The method for preparing a starch composite foam material as claimed in claim 7, wherein the foaming process is a supercritical foaming process.

9. The method for preparing a starch composite foam material as claimed in claim 7, further comprising adding a foaming agent during the foaming process.

10. The method for preparing a starch composite foam material as claimed in claim 9, wherein the foaming agent comprises carbon dioxide or nitrogen gas.

11. The method for preparing a starch composite foam material as claimed in claim 7, wherein the starch glue further comprises silicon dioxide ($SiO_2$) nanoparticles having a particle size ranging from 1 nm to 300 nm.

* * * * *